(12) United States Patent
Serve et al.

(10) Patent No.: US 8,678,627 B2
(45) Date of Patent: Mar. 25, 2014

(54) COVERING OF AN EXTERIOR REAR VIEW MIRROR ASSEMBLY

(75) Inventors: Gregor Serve, Stuttgart (DE); Peter Hein, Denkendorf (DE)

(73) Assignee: SMR Patents S.a.r.l., Luxembourg (LU)

( * ) Notice: Subject to any disclaimer, the term of this patent is extended or adjusted under 35 U.S.C. 154(b) by 156 days.

(21) Appl. No.: 13/302,740

(22) Filed: Nov. 22, 2011

(65) Prior Publication Data

US 2012/0127745 A1 May 24, 2012

(30) Foreign Application Priority Data

Nov. 22, 2010 (EP) .................................. 10192002

(51) Int. Cl.
*B60R 1/12* (2006.01)
*B29C 45/16* (2006.01)

(52) U.S. Cl.
USPC ............................ 362/494; 362/516; 362/511

(58) Field of Classification Search
USPC ............ 362/494, 516, 511; 264/134; 248/466
See application file for complete search history.

(56) References Cited

U.S. PATENT DOCUMENTS

| 5,942,324 A | 8/1999 | Chu et al. |
| 6,419,300 B1 | 7/2002 | Pavao et al. |
| 2001/0055214 A1 | 12/2001 | Chang |

FOREIGN PATENT DOCUMENTS

| DE | 4138934 | 5/1993 |
| EP | 0353475 | 2/1990 |
| EP | 0863050 | 9/1998 |

OTHER PUBLICATIONS

European Search Report for application No. EP 10 19 2002 dated Apr. 19, 2011.

*Primary Examiner* — Anh Mai
*Assistant Examiner* — Elmito Breval
(74) *Attorney, Agent, or Firm* — Reising Ehtington P.C.

(57) ABSTRACT

A covering (16) for an exterior rear view mirror assembly for motor vehicles includes a plurality of covering parts (17, 18, 19, 20) defining a contact point (24) between each of the plurality of covering parts (17, 18, 19, 20). At least one of the covering parts (17, 18, 19, 20) is provided in a two-component or multi-component injection molding procedure. A coating (25) of plastic forms an outer layer, which covers the covering parts (17, 18, 19, 20). The coating (25), being a light-resistant and transparent plastic, forms a high-gloss surface. One of the covering parts (17, 18, 19, 20) is void of the coating (25) at the contact point (24).

10 Claims, 2 Drawing Sheets

COVERING OF AN EXTERIOR REAR VIEW MIRROR ASSEMBLY

The invention is based on a priority patent application EP 10192002.3 which is hereby incorporated by reference.

BACKGROUND ART

1. Field of the Invention

The invention relates to a covering of an exterior rear view mirror assembly for motor vehicles.

2. Description of the Related Art

An exterior rear view mirror assembly for a motor vehicle consists, for example, of a mirror base arranged on the motor vehicle, which mirror base can be covered by means of a mirror base cover, and an exterior rear view mirror arranged on the mirror base. The exterior rear view mirror includes an exterior rear view mirror housing, which, inter alia, accommodates a base bracket assigned to the mirror base, includes one of this type, or is included by one of this type.

The mirror base and the base bracket are hinged together, so that the exterior rear view mirror can be pivoted about a hinge axis in relation to the mirror base from an operating position into a folded position and vice versa. The mirror base and base bracket can be produced from die-casting material, for example, from the same material.

An adjusting device for a mirror glass, driven by an electric motor, for example, can be arranged on the base bracket. The adjusting device acts on a backing plate, on which the mirror glass is arranged. The mirror glass can be mounted onto the backing plate by means of a locking connection or an adhesive connection, for example. The backing plate can be guided by and/or mounted on the adjusting device and/or the base plate. The term 'backing plate' here refers to a bracket, which comprises at least one bracket surface, with a plane or vaulted design, closed or in a non-continuous grid, for example, honeycombed, on which it is suitable to attach a mirror glass, for example by means of an adhesive connection or by clipping e.g. latch means, protruding behind the perimeter of the carrier plate and arcing inwards towards the centre of the bracket surface, seen from the perimeter.

On its rear side, facing away from the direction of movement of the vehicle in the operating position, the exterior rear view mirror housing comprises an opening, through which the mirror glass is visible, or in which the mirror glass is arranged. In order to ensure that the mirror glass is adjustable, a distance is kept on all sides between the mirror glass or backing plate and the walls of the exterior rear view mirror housing surrounding the opening, so that a gap is given around the mirror glass between the walls of the exterior rear view mirror housing surrounding the opening.

Additionally, the exterior rear view mirror can comprise a turn signal indicator, a heatable mirror glass, an electro-chromatically dimmable mirror glass, a recording and/or warning display module for a driving assistance device, such as blind spot monitoring, a lane departure warning, approach monitoring, or similar, or a combination thereof. Alternatively or additionally, the exterior rear view mirror can also comprise at least one sensor for recording driving and/or surrounding conditions, such as for example, temperature, brightness, degree of pollution, lighting situation, for example, in order to automatically heat the mirror glass, or to dim electro-chromatically, for example.

For example, in order to simplify the assembly of the different components at least partly housed in the inside of the exterior rear view mirror housing, component groups as well as, if necessary, their electrical connections between each other and/or with a control unit housed on the motor vehicle side, the exterior rear view mirror can be designed in at least two parts. A first housing part forms the housing base, for example, and a second housing part forms the housing cover. At the same time, one of both housing parts can include the housing section lying around the opening for the mirror glass, with the walls surrounding the opening. It is also possible that the housing section is formed by a third housing part in the form of a separate frame.

The mirror base cover, if necessary, can also be formed in one or several parts.

At least the exterior mirror housing in one or several parts, as well as the mirror base cover provided in one or several parts, if necessary, form a covering of the exterior rear view mirror assembly, which consists of at least two covering parts, which are connected together. In the process, for example, the at least one housing part of the exterior rear view mirror housing and the at least one cover part of the mirror base cover, provided if necessary, at least form the covering parts, which are connected together, of the covering of the exterior rear view mirror assembly.

At least one further covering part can be at least one cover, which is flushly inserted into the external contour of the exterior rear view mirror assembly. This can here concern at least one cover, which can be provided for protecting at least one electrical component at least partly accommodated in the exterior rear view mirror housing and/or in the mirror base cover from the influences of weathering. A light disc of a turn signal indicator arranged in the exterior rear view mirror shows a cover of this type or a covering part of this type, for example.

A cover of this type can also be part of one or several electrical components, or can be included by these. Therefore, one or several electrical components of the exterior rear view mirror assembly also at least partly form one or several covering parts of the covering.

Examples of electrical components, which can at least partly form a covering part, or can be protected against the influences of weathering by a cover inserted flushly in the exterior contour of an exterior rear view mirror assembly, are:
  a turn signal indicator,
  an entry light,
  a detection module and/or warning display module for a
     driving assistance device, such as blind spot monitoring,
     a lane departure warning, approach monitoring, or similar,
  a sensor for detecting driving conditions and/or surrounding conditions, such as for example, temperature, brightness, degree of pollution, lighting situation, for example, in order to automatically heat the mirror glass, or to dim electro-chromatically, for example.

Depending on whether the respective cover and/or the respective electrical components are accommodated in the exterior rear view mirror housing or in the mirror base cover, this forms a covering part of the exterior rear view mirror housing or the mirror base cover.

In order to guarantee a simple assembly, the respective covering parts of the exterior rear view mirror housing and/or the respective covering parts of the mirror base cover can be connected together by non-rotatable, detachable or non-detachable, fixed connections, for example, by locking connections. At least adjacent covering parts touch one another on one or several punctiform and/or linear and/or flat contact surfaces.

One or several contact points can for example form one or several contact surfaces orientating the housing parts to one another. For example, the whole contour, along which two covering parts touch one another, can form a contact surface. Stops, straps, rearward engagements and similar provided on the covering parts can be provided on the basis of contact surfaces lying along a straight line, in order to act in a hinge-type manner, so that the two covering parts can be folded onto one another about the hinge-joint axis. For example, opposite the hinge-joint axis, one or several locking connections, bolted connections or rivet joints can be provided, which, for example, together with the contact surfaces, connect both covering parts together. Alternatively or additionally, other non-rotatable, fixed connections can be provided between two or several covering parts, for example, bolted connections or riveted joints.

The connection between the exterior rear view mirror housing and the mirror base cover provided if necessary concerns, in contrast, an articulated connection which can be pivoted about the hinge axis. This articulated connection can be, for example, a pin running along the hinge axis, for example, protruding on a first joint socket, and a bearing opening embedded in a second joint socket, which receives the pin, for example. The pin and the bearing opening can here be provided opposite one another on the base bracket and on the mirror base, whereby the choice of whether the pin is provided on the base bracket or on the mirror base and the bearing opening is provided on the corresponding opposite side, is free in principle. The covering parts connected together by the articulated connection can comprise the surface sections assigned to the articulated connections and/or can comprise surface sections, which are arranged within the respective region of the connection, in which the covering parts connected together are in direct contact with one another. These surface parts can touch each other at least temporarily and at least partly, and thus form contact points between the covering parts, which are connected by the articulated connection and/or are additionally connected together.

Independently of whether there is a non-rotatable, fixed connection or an articulated connection between two or several covering parts, it is common to the connections that they comprise punctiform and/or linear and/or areal contact surfaces, on which the covering parts can touch one another. If a connection includes a locking connection, at least one contact point can be situated between the corresponding locking elements of the locking connection, which are in contact with one another.

In the automotive industry, very high demands are made with regard to the quality of the surfaces of coverings. At the same time, the production and assembly costs should be low.

In order to fulfill these requirements, it is known to design surfaces of covers with high gloss. Therefore, subsequent surface treatments, such as varnishing work, or such readying treatments, are made much simpler. If necessary, a subsequent surface treatment can be completely omitted.

US 20010055214 A1 describes an exterior mirror, of which the housing is produced from a transparent or semi-transparent material. Injection molding is the manufacturing process in this case. A coating is applied in a following step. The coating is done by application, spraying on or by vacuum deposition. This layer 6 on the housing 4 is opaque. Production is not possible in a plastic injection molding tool.

U.S. Pat. No. 6,419,300 B1 shows a solution, in which the coverings are not produced in a multi-component injection molding procedure, but rather by applying a film. The film 18 consists of several coats of materials, and is pre-assembled as a film and applied onto the housing.

In the case of simpler and more cost-effective production, it is known in EP 0 863 050 B1 to provide a covering part with a coating of light-resistant and transparent plastic, in order to avoid damages to the appearance of the plastic of a covering of an exterior rear view mirror housing. Through this, the covering part itself can be manufactured from a cost-effective and dyed plastic, for example, so that the color of the covering part can be adapted to the color of the motor vehicle. The coating prevents the plastic of the covering part from experiencing color changes. Polycarbonate, particularly preferably high-gloss PMMA, for example, is used for the coating. For simple manufacturing, as well as a flawless appearance of a multi-part exterior rear view mirror housing and/or a multi-part mirror base cover, for example, the coating extends into the inner side of the covering part.

In addition, it is known in U.S. Pat. No. 5,942,324 that a coating of this type has a refractive index of between 1.35 and 1.67 and can be provided with supplements in order to increase the scratch resistance and impact strength. Supplements can also be provided, which create a metallic effect of the color of the plastic lying below.

The disadvantage of coverings provided with coatings of this type, particularly high-gloss coatings, is noise development on the contact points between the covering parts, which is not in accordance with the high quality demands of the automotive industry. These noise developments are noticeable due to rattles, and/or squeaking noises and/or grinding noises, which occur in normal vibrations in operation of a motor vehicle. In the coverings including the mirror base cover and the exterior rear view mirror housing, noise development also occurs when pivoting the exterior rear view mirror in relation to the mirror base about the hinge axis from an operating position into a folded position and vice-versa.

An object of the invention is the creation of a covering of an exterior rear view mirror assembly for a motor vehicle, which on one hand meets the high qualitative demands, also with regard to a preferably high-gloss, purified surface in the automotive industry, and on the other hand, also meets the high qualitative demands with regard to low noise development. At the same time, the covering should be easy to produce and also easy to assemble.

The object is achieved by features of the independent claim 1.

Thus, a covering of an exterior rear view mirror assembly for motor vehicles is provided, which is formed in at least two parts. The covering in at least two parts consists of at least two covering parts connected together.

At least two connecting parts touch one another, so that there are one or several contact points between the covering parts, which are connected by the at least one contact point and/or are additionally connected together.

At least one covering part is provided in a two-component or multi-component injection molding procedure with a coating forming an outer layer of preferably light-resistant and preferably transparent plastic.

The coating can extend into the inner side of the covering part.

In order to prevent rattles, squeaking noises and grinding noises on the at least one contact point during the operation of a motor vehicle, it is provided that at least one surface section, including the at least one contact point, of at least one of the covering parts, which are connected by the at least one contact point and/or are additionally connected together, is released from the coating.

The at least one contact point can be included by a non-rotatable, fixed connection and/or an articulated connection between at least two covering parts.

At least one connection between two or several covering parts can include a locking connection. A locking connection, also denoted as a clip connection or a snap connection, includes corresponding locking elements, of which at least one is elastically deformable, and following a deformation, hooks detachably or inextricably with at least another to produce the locking connection. Examples of corresponding locking elements of this type are an elastically deformable locking means and a rearward engagement.

At least one contact point is situated between the corresponding locking elements of the locking connection.

The plastic of the coating particularly preferably forms a high-gloss surface.

Polycarbonate, particularly preferably, high-gloss polymethylmethacrylate (PMMA) is preferably used for the coating.

The covering parts, which are connected by the at least one contact point and/or are additionally connected together, may comprise housing parts of an exterior rear view mirror housing.

Alternatively or additionally, the covering parts, which are connected by the at least one contact point and/or also connected together, may comprise cover parts of a mirror base cover.

The covering parts, which are connected by at least one contact point and/or also connected together, can also concern at least one housing part of an exterior rear view mirror housing, and at least one cover of at least one electrical component accommodated in the exterior rear view mirror e.g. flushly inserted into the exterior contour of the exterior rear view mirror housing.

The covering parts, which are connected by at least one contact point and/or also connected together, can also concern at least one housing part of a mirror base cover and at least one cover of at least one electrical component accommodated in the exterior rear view mirror e.g. flushly inserted into the exterior contour of the mirror base cover.

The cover can be part of the electrical components or can be included by the electrical components. For example, the cover can concern a light disc of a turn signal indicator and/or exit lighting or ambient lighting.

Particularly preferably, the covering parts connected by at least one contact point and/or also connected together concern at least one housing part of an exterior rear view mirror housing and at least one cover part of a mirror base cover. Both covering parts are here connected to one another in such a way that they can pivot about their respective hinge axes, about which the exterior rear view mirror of the exterior rear view mirror assembly can be pivoted in relation to the mirror base from an operating position into a folded position and vice-versa.

The at least one contact point can also form at least one contact surface, include one of this type, or can be included by one of this type.

For example, the contact surfaces can concern a hinge-type connection between two covering parts, whereby the covering parts for their common connection together fold onto each other about a hinge-joint axis and are connected together by a locking connection, bolted connection, riveted joint, welded joint or adhesive connection on at least one point differing from the hinge-joint axis.

The covering can also comprise one or several of the features described at the outset.

In addition, an exterior rear view mirror assembly, for which a previously described covering can be provided, can comprise one or several of the features described at the outset.

Advantages of the invention in relation to the prior art are given, inter alia, by particularly simple production, which renders laborious reworks unnecessary e.g. contact points according to the prior art, which generate rattles, squeaking noises and grinding noises. By forgoing a high-gloss coating, at least directly on the contact points, there is no occurrence of noise development which has been found to reduce the quality. Simultaneously, the coating particularly considered as high quality in the exterior view can be maintained, so that simultaneously a qualitatively high-quality impression of the exterior view can be obtained.

Further features of the invention result from the claims, description and drawings.

BRIEF DESCRIPTION OF THE DRAWINGS

Preferred embodiments of the invention are subsequently explained in more detail with reference to the drawings. Identical reference characters denote identical or identically acting elements. In the drawings, shown schematically.

DETAILED DESCRIPTION OF THE PREFERRED EMBODIMENT(S)

Figure 1:
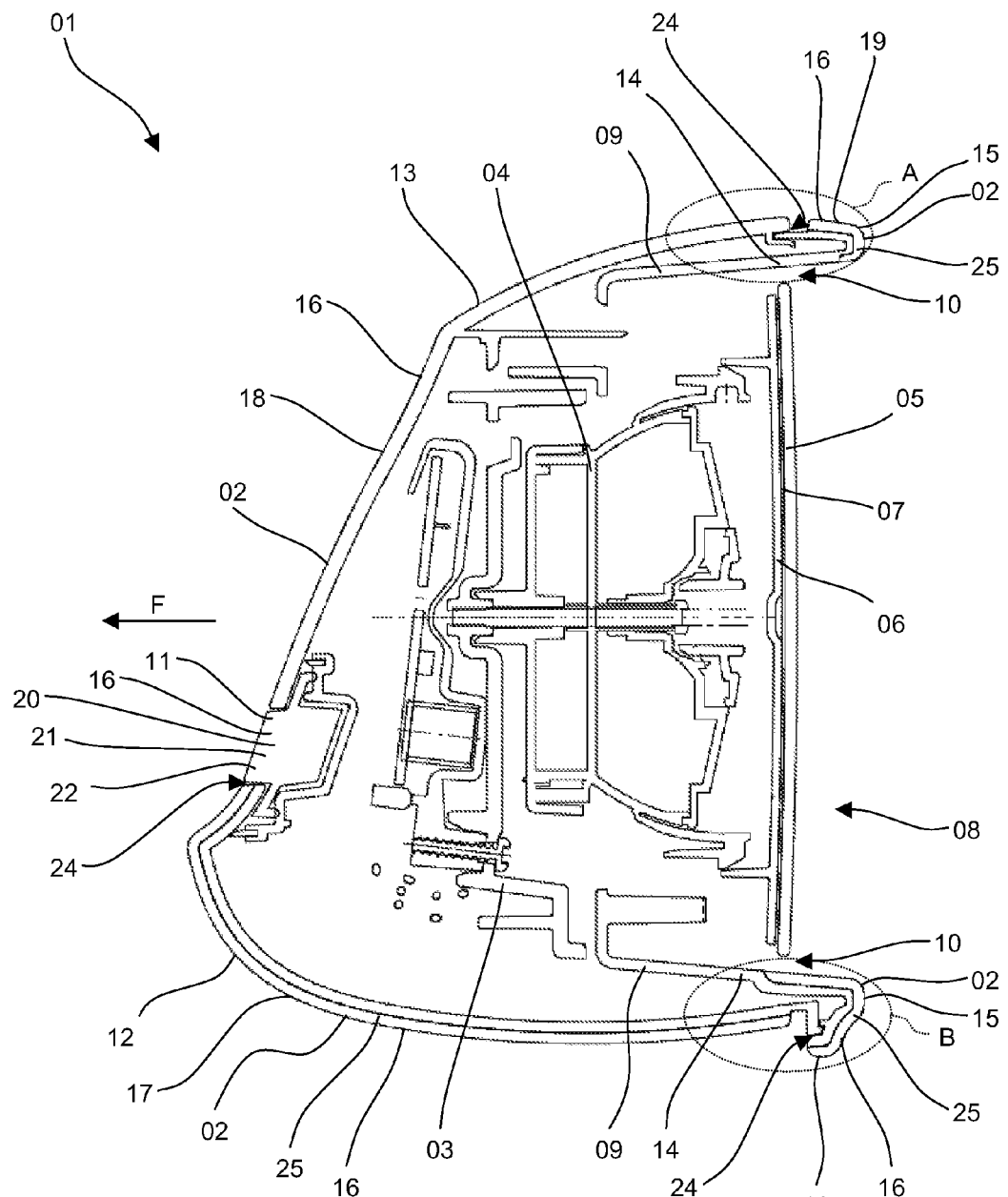
FIG. 1 shows a cross-section through an exterior rear view mirror of an exterior rear view mirror assembly.
Figure 2:
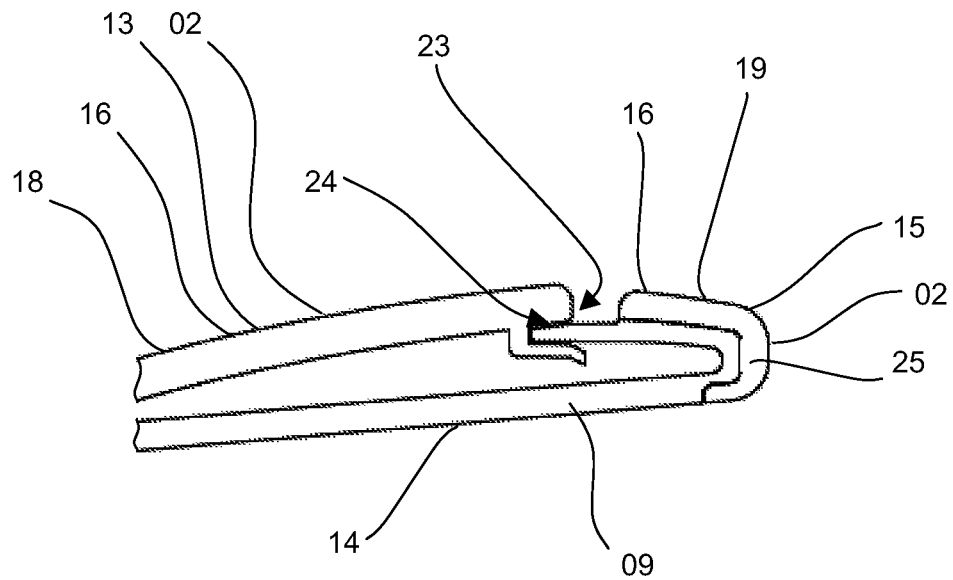
FIG. 2 shows an enlarged view of the details marked by A in FIG. 1.
Figure 3:
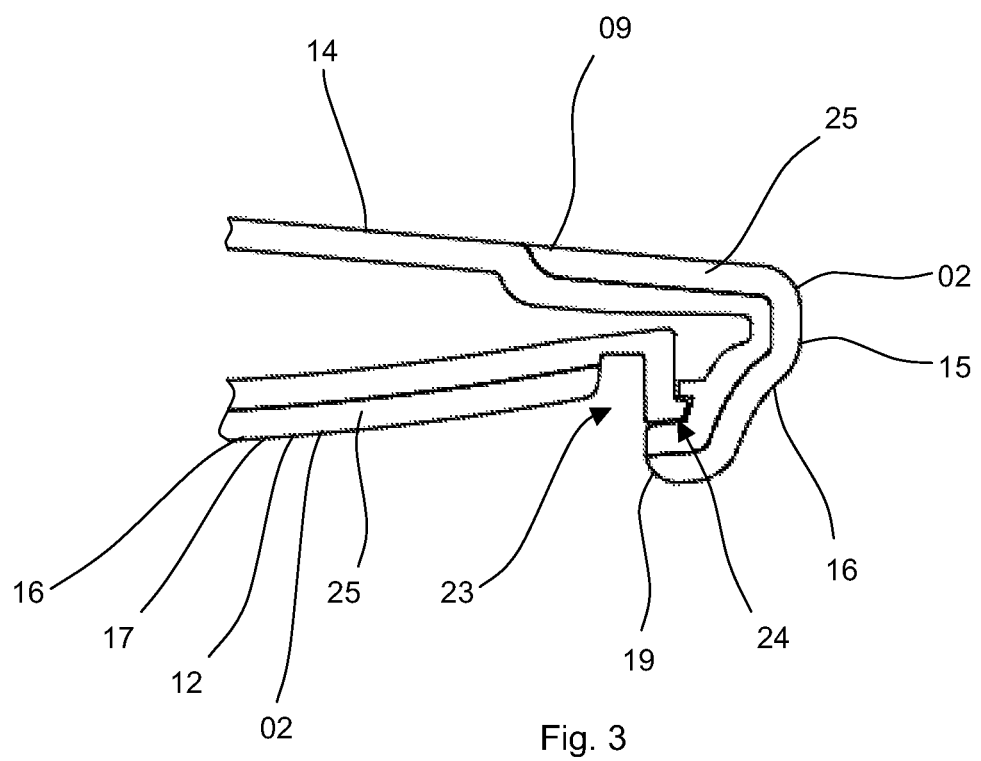
FIG. 3 shows an enlarged view of the details marked by B in FIG. 1.

An exterior rear view mirror 01 of an exterior rear view mirror assembly for a motor vehicle, fully or partly shown in FIGS. 1 to 3, includes an exterior rear view mirror housing 02, which, inter alia, can accommodate a base bracket 03 assigned to the mirror base arranged on the motor vehicle. The mirror base, not shown, can be covered by a mirror base cover. The exterior rear view mirror 01 is arranged on the mirror base.

An adjusting device 04 for a mirror glass 05, driven by an electric motor, for example, can be arranged on the base bracket 03. The adjusting device 04 acts on a backing plate 06, on which the mirror glass 05 is arranged. The mirror glass 05 can be mounted onto the backing plate 06 by means of a locking connection or an adhesive connection 07, for example. The backing plate 06 can be guided to and/or mounted on the adjusting device 04 and/or the base plate 03.

The backing plate 06 forms a bracket, which includes at least one bracket surface, with a plane or vaulted design, closed or in a non-continuous grid, for example, honeycombed, on which it is suitable to attach a mirror glass 05 for example by means of an adhesive connection 07 or by clipping, e.g. latch means, protruding behind the perimeter of the carrier plate and arcing inwards towards the center of the support surface, seen from the perimeter.

The base bracket 03 and the mirror base are hinged together, so that the exterior rear view mirror 01 can be pivoted about a hinge axis in relation to the mirror base from an operating position into a folded position and vice versa.

On its rear side, facing away from the direction of movement of the vehicle, shown by arrow F, in the operating position, the exterior rear view mirror housing 02 comprises an opening 08, through which the mirror glass 05 is visible, or in which the mirror glass is arranged 05. In order to ensure that the mirror glass 05 is adjustable, a distance is kept on all sides between the mirror glass 05 or backing plate 06 and the walls 09 of the exterior rear view mirror housing 02 surrounding the opening 08, so that a gap 10 is given around the mirror glass 05 between the walls 09 of the exterior rear view mirror housing 02 surrounding the opening 08.

The exterior rear view mirror 01 can include a turn signal indicator 11. Alternatively or additionally, the exterior rear view mirror 01 can include exit lighting or background lighting, a heatable mirror glass 05, an electro-chromatically dimmable mirror glass 05, a recording and/or warning display module for a driving assistance device, such as blind spot monitoring, a lane departure warning, approach monitoring, or similar, or a combination thereof. Additionally, the exterior rear view mirror 01 can also include at least one sensor for recording driving and/or surrounding conditions, such as for example, temperature, brightness, degree of pollution, lighting situation, for example, in order to automatically heat the mirror glass 05, or to dim electro-chromatically, for example.

The exterior rear view mirror housing 02 can be formed in two parts or in a plurality of parts, for example, in order to simplify components housed in it, component groups as well as their electrical connections between one another, if necessary, and/or with a control device accommodated in the motor vehicle side, for example. A first housing part 12 forms the housing base, for example, and a second housing part 13 forms the housing cover. One of both housing parts 12, 13 can include a housing section 14 lying around the opening 08 for the mirror glass 05, with the walls 09 surrounding the opening 08. It is also possible that the housing section 14 is formed by a third housing part 15 in the form of a separate frame.

The mirror base cover, provided if necessary, of the mirror base, not shown, can also be designed in one or several parts.

At least the exterior rear view mirror housing 02 in one or several parts, as well as the mirror base cover in one or several parts, provided if necessary, can form a covering 16 of the exterior rear view mirror assembly. The covering 16 consists of a plurality of covering parts 17, 18, 19, 20 connected together.

In addition to the connection part 17 formed by the housing base or the first housing part 12, the connection part 18 formed by the housing cover or the second housing part 13, the connection part 19 formed by the frame, if necessary, or the third housing part 15, at least one cover 21 flushly inserted into the outer contour of the exterior rear view mirror 01 of the exterior rear view mirror assembly can form a further covering part 20. The cover 21 can be provided, for example, for protecting at least one electrical component at least partly housed in the exterior rear view mirror housing 02 from the influences of weathering.

In addition, the cover 21 can be a part of one or several electrical components, or can be included by least one electrical component.

The cover 21 in FIG. 1 concerns a light disc 22 of the turn signal indicator 11 at least partly housed in the exterior rear view mirror housing 02 of the exterior rear view mirror 01.

At least adjacent covering parts 17, 18, 19, 20 touch one another on one or several punctiform and/or linear and/or flat contact surfaces 24. One or several contact points 24 can at least partly form one or several contact surfaces, which can serve for orienting the covering parts 17, 18, 19, 20, which are connected by a contact point 24 and/or also connected together, against each other. Also, one or several contact points 24 of adjacent covering parts 17, 18, 19, 20 can at least partly engage in one another in a hinge-type manner, and therefore can at least partly contribute to the connection of the covering parts 17, 18, 19, 20.

In order to meet the very high demands in the automotive industry with regard to the quality of the surfaces of coverings 16, one or several of the covering parts 17, 18, 19, 20 can be provided in a two-component or multi-component injection molding procedure with at least one high-gloss coating 25 of plastic, for example, forming at least one outer layer.

The coating 25 of at least one covering part 17, 18, 19, 20 provided with this can extend into the inner side of the covering part 17, 18, 19, 20.

In order to prevent rattles, squeaking noises and grinding noises on the at least one contact point 24 during the operation of a motor vehicle, it is provided that at least one surface section 23, including the at least one contact point 24 on at least one of the covering parts 17, 18, 19, 20, which are connected by the at least one contact point 24 and/or also connected together, is released from or void of the coating 25.

Without the release of the surface section 23, the described noise development would occur, which results, for example, from vibrations during operation of the motor vehicle of a surface formed by the coating 25, and which is particularly straight and hard, where applicable, against a second surface, where applicable also produced by a coating 25, causing microscopic and/or macroscopic movements.

The invention is particularly commercially applicable in the production of exterior rear view mirror assemblies for motor vehicles.

LIST OF REFERENCE CHARACTERS

01 Exterior rear view mirror
02 Exterior rear view mirror housing
03 Base bracket
04 Adjusting device
05 Mirror glass
06 Backing plate
07 Adhesive connection
08 Opening
09 Wall
10 Gap
11 Turn signal indicator
12 First housing part
13 Second housing part
14 Housing section
15 Third housing part
16 Covering
17 Covering part
18 Covering part
19 Covering part
20 Covering part
21 Cover
22 Light disc
23 Surface section
24 Contact point
25 Coating
A Detail
B Detail
F Direction of movement

The invention claimed is:

1. A covering (16) for an exterior rear view mirror assembly for motor vehicles, said covering (16) comprising:
a plurality of covering parts (17, 18, 19, 20) defining a contact point (24) between each of said plurality of covering parts (17, 18, 19, 20), whereby at least one of said plurality of covering parts (17, 18, 19, 20) is provided in a two-component or multi-component injection molding procedure, wherein said contact point includes a hinge joint connection between two of said plurality of covering parts (17, 18, 19, 20), whereby said two of said plurality of covering parts (17, 18, 19, 20) are folded onto each other about an axis defined by said hinge-joint connection;

a coating (25) of plastic forming at least one outer layer to cover said plurality of covering parts (17, 18, 19, 20), said coating (25) includes polycarbonate and/or PMMA;

said coating (25) being a light-resistant and transparent plastic, said coating (25) forming a high-gloss surface, wherein one of said plurality of covering parts (17, 18, 19, 20) is void of said coating (25) at said contact point (24).

2. A covering (16) according to claim 1, wherein said two of said plurality of covering parts (17, 18, 19, 20) include housing part (12, 13, 15) of an exterior rear view mirror housing (02) and a cover part of a mirror base cover, whereby both of said two of said plurality of covering parts (17, 18, 19, 20) are connected to one another in such a way that they can pivot about a hinge axis, about which the exterior rear view mirror (01) of the exterior rear view mirror assembly can be pivoted in relation to the mirror base from an operating position into and out of a folded position.

3. A covering (16) according to claim 1, wherein said contact point (24) is defined by a position whereby all of said plurality of covering parts (17, 18, 19, 20) are non-rotatable with respect to each other thereat.

4. A covering (16) according to claim 3 including a locking connection at said contact point (24) between two or more of said plurality of covering parts (17, 18, 19, 20).

5. A covering (16) according to claim 4, wherein said locking connection includes locking elements extending along said contact point (24).

6. A covering (16) according to claim 4, wherein one of said plurality of covering parts (17, 18, 19, 20) includes an electrical component (11) of the exterior rear view mirror assembly.

7. A covering (16) according to claim 6, wherein said electrical component (11) includes at least one of said plurality of covering parts (17, 18, 19, 20).

8. A covering (16) according to claim 7, wherein said electrical component (11) includes a light disc (22).

9. A covering (16) according to claim 1, wherein one of said plurality of covering parts (17, 18, 19, 20) is a housing part (12, 13, 15) of the exterior rear view mirror housing (02).

10. A covering (16) according to claim 1, wherein one of said plurality of covering parts (17, 18, 19, 20) is a cover part of a mirror base cover.

* * * * *